(12) United States Patent  (10) Patent No.: US 6,236,333 B1
King  (45) Date of Patent: May 22, 2001

(54) PASSIVE REMOTE KEYLESS ENTRY SYSTEM

(75) Inventor: Joseph David King, Ann Arbor, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/098,612

(22) Filed: Jun. 17, 1998

(51) Int. Cl.$^7$ .................................................. G06F 7/04
(52) U.S. Cl. ................... 340/825.31; 340/10.1; 340/10.3; 340/10.4; 340/10.33; 340/10.34
(58) Field of Search ................ 340/825.31, 572.6, 340/551, 10.1, 10.3, 10.33, 10.34, 10.4

(56) References Cited

U.S. PATENT DOCUMENTS

| 3,725,939 | 4/1973 | Saltzstein . |
| 5,826,450 | * 10/1998 | Lerchner et al. ................ 70/278 |
| 5,973,611 | * 10/1999 | Kulha et al. ................ 340/825.31 |

FOREIGN PATENT DOCUMENTS

| 0 735 219 A2 | 2/1996 | (EP) . |
| 2 732 798 | 11/1996 | (FR) . |
| 2 749 607 | 12/1997 | (FR) . |

OTHER PUBLICATIONS

International Search Report, Oct. 27, 1999.

* cited by examiner

*Primary Examiner*—Michael Horabik
*Assistant Examiner*—William Bangachon
(74) *Attorney, Agent, or Firm*—Brooks & Kushman P.C.

(57) ABSTRACT

A passive remote keyless entry system includes a plurality of sensors each associated with a door of the vehicle. Each sensor detects the presence and distance of a key fob from the sensor. By monitoring the distance of the key fob from the sensor, the sensor determines if the key fob is approaching or moving away from the associated door. If the sensor determines that the key fob is approaching, an interrogation signal is sent from the security system to the key fob. If the proper code is returned by the key fob, the associated door is unlocked. If the sensor determines that the key fob is moving away from the associated door, the doors are locked. The sensors can also determine whether the key fob is simply passing by, in which case the driver probably does not wish to enter the vehicle.

20 Claims, 2 Drawing Sheets

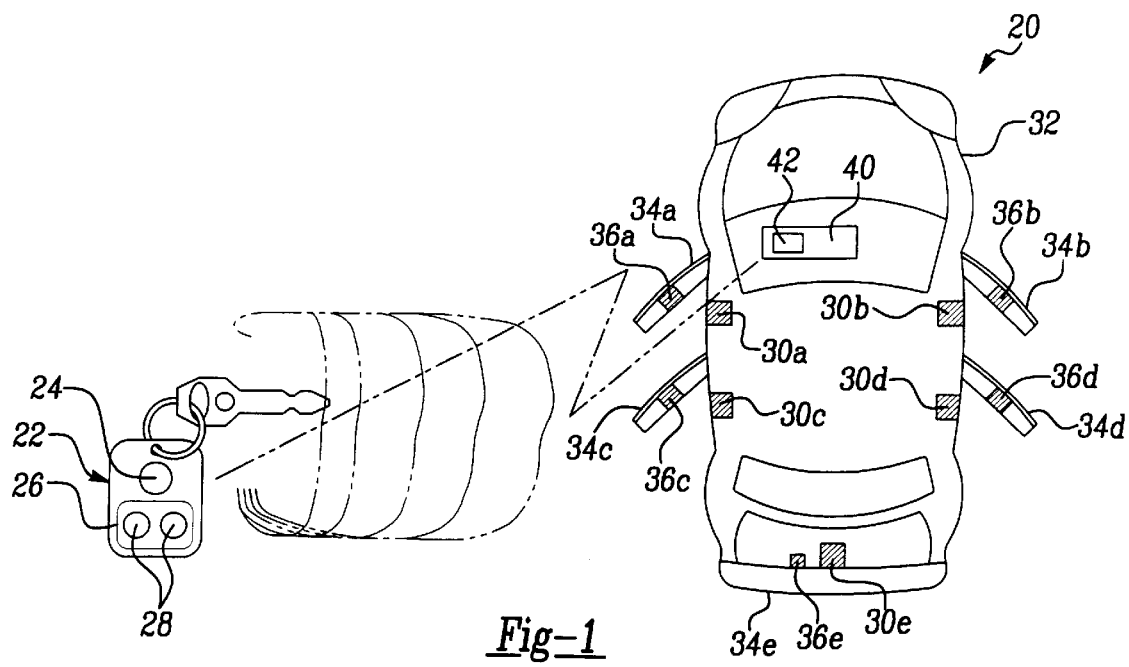
Fig-1
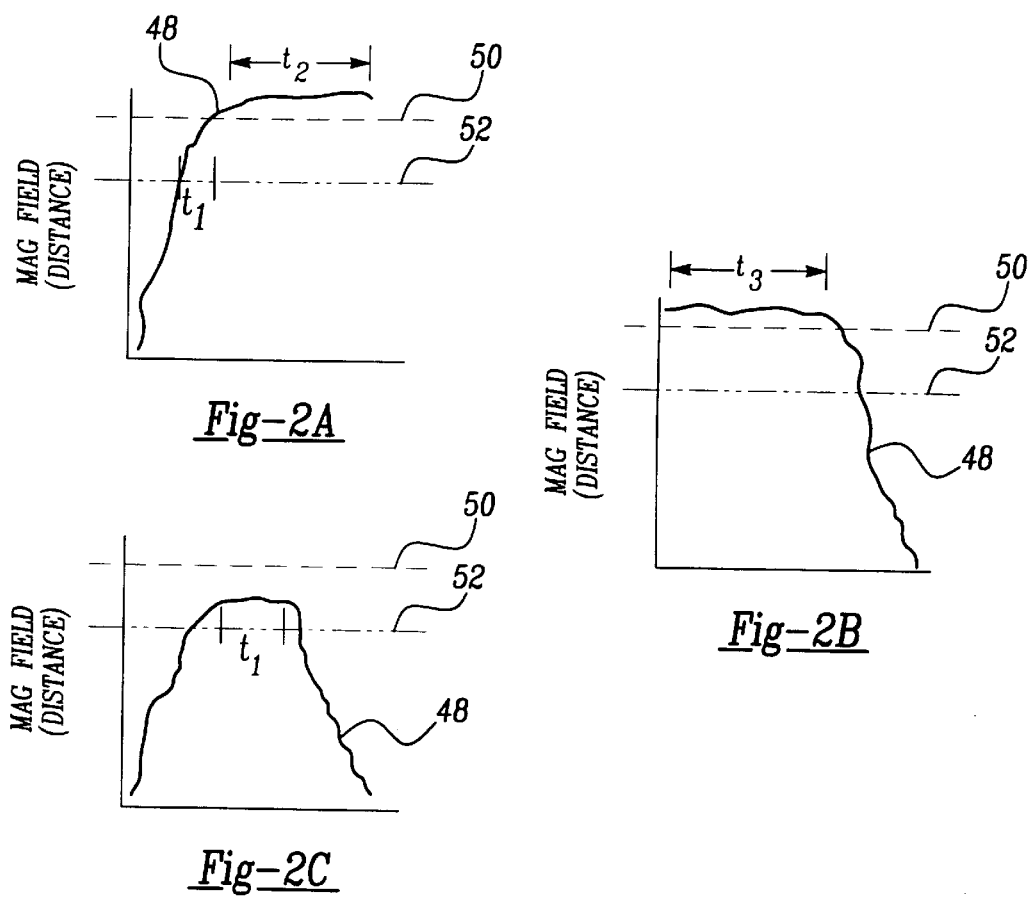
Fig-2A
Fig-2B
Fig-2C

PASSIVE REMOTE KEYLESS ENTRY SYSTEM

BACKGROUND OF THE INVENTION

The present invention relates generally to passive security systems, and more particularly to a passive remote keyless entry system for a vehicle.

Remote Keyless Entry (RKE) is being installed at an ever increasing rate in automobiles. The dramatic rate of installation is being fueled by consumer acceptance and subsequent demand of RKE systems. Additional improvements in RKE system technology are possible and are even being requested by the consumer. The problem of fumbling for the existing active RKE FOB while standing in the rain or when in an emergency situation has provided the motivation to design and implement a passive RKE system.

Existing passive RKE systems cause unintentional lock actuations when the consumer is in the near vicinity of the vehicle whose desires do not include unlocking the vehicle ("false alarms"). False alarms present an additional drain on the vehicle and FOB batteries, prematurely reducing the operating life of the locking system. They can also present a security issue if the false alarm leaves the doors unlocked.

Many RKE schemes have been investigated incorporating capacitive/inductive proximity sensors and optical sensors. Many problems are associated with such sensors in addition to the prohibitive cost. For example, optic sensors suffer from contaminants (i.e. dirt, grease, salt, etc.) causing the lenses (apertures) to become opaque to the optic energy. Thermal sensors suffer in that they are unsuitable for detecting gloved hands (if under the door handle) or wearing winter clothes.

The task is further complicated by the relatively long actuation time required for the lock motors/solenoids and mechanical linkage to change the state of the lock(s). This means the passive RKE system must "read the consumer's mind", at a distance far enough away from the lock (door) to allow sufficient time for the locks to unlock the door, without compelling the consumer to manipulate the door handle more than once.

SUMMARY OF THE INVENTION

The present invention provides a passive remote keyless entry system which includes a plurality of sensors each associated with a door of the vehicle (including the trunk). The sensors detect the presence and distance of a key fob from the sensor. By monitoring the distance of the key fob from the sensor, the sensor can determine if the key fob (and the driver) is approaching the associated door, moving away from the associated door, or simply passing by. If a sensor determines that the key fob is approaching it, an interrogation signal is sent from the security system to the key fob, in response to which the key fob sends a code. If the proper code is transmitted by the key fob, the door associated with the sensor is unlocked. Similarly, if the sensor determines that the key fob is moving away from the associated door, the associated door is locked or all of the doors are locked.

Preferably, the security system includes a sleep mode in which power is conserved. When one of the sensors determines that the key fob is within a second predetermined threshold distance greater than the first predetermined threshold distance from the sensor the security system wakes up and enters full power mode. Then, when the key fob is detected to be within the first predetermined threshold distance, the security system is ready to transmit the interrogation signal.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which:

FIG. 1 is a schematic of the passive remote keyless entry system of the present invention.

FIGS. 2a–c are graphs indicating three modes of operation of the system of FIG. 1.

DETAILED DESCRIPTION OF A PREFERRED EMBODIMENT

Figure 3:
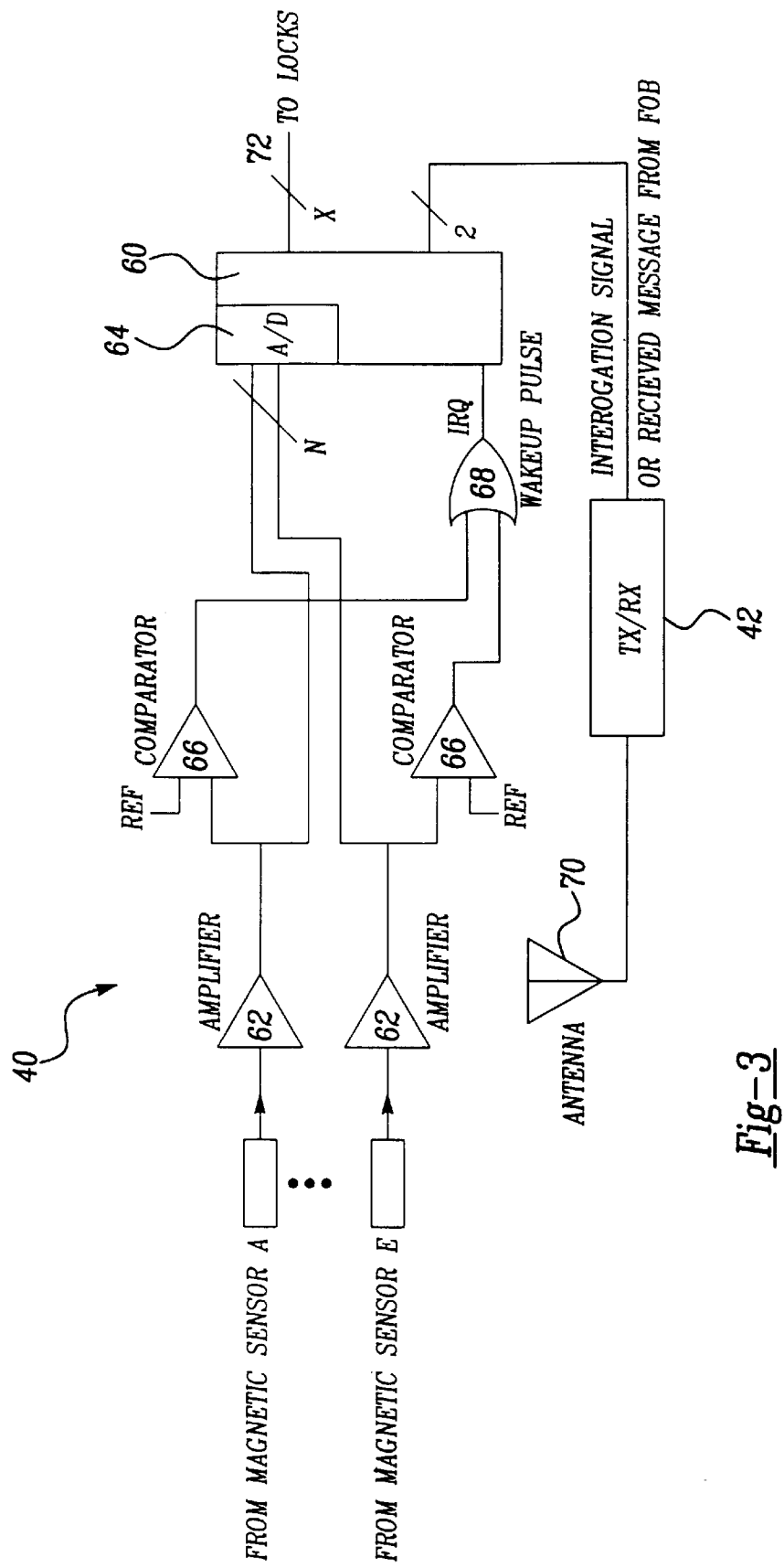
FIG. 3 is a lower level schematic of the system of FIG. 1.

A passive remote keyless entry system 20 according to the present invention is shown schematically in FIG. 1. A key fob 22 contains at least one high intensity rare earth (e.g., neodymium, samarium-cobalt) permanent magnet 24. The key fob 22 includes a transmitter 26, such as RF, infrared, microwave, etc., which selectively transmits a code, which may be rolled or encrypted according to known techniques. User activated buttons 28 are connected to the transmitter 26 for optional manual operation. As shown, the magnet 24 could alternatively be mounted on one of the keys, on the keyring, or otherwise secured to the key fob.

A plurality of magnetic sensors 30a–e are mounted on a vehicle 32 and each is associated with a door 34a–e (including trunk 34e). Each of the doors 34a–e has an associated actuator 36a–e which selectively locks and unlocks the associated door 34a–e. All of the sensors 30a–e and actuators 36a–e are connected to a controller 40 (connections not shown for clarity). The controller 40 includes a transmitter/receiver 42 generally as is utilized in remote keyless entry systems.

The magnetic field sensors 30a–e are selected to have enough dynamic range to exploit the differences in the measured flux density due to the magnet 24 installed as part of the key fob 22. The magnetic field sensors 30a–e continuously (or at discrete intervals) measure magnetic field intensity over time and transmit this information to the controller 40. The controller 40 preferably includes a microprocessor having software programmed to perform functions as described herein. Generally, in a manner that will be described below, the controller 40 receives signals over time from each of the magnetic field sensors 30a–e and selectively sends signals which activate, or deactivate, to any or all of the actuators 36a–e.

FIGS. 2a–c illustrate three profiles generated by one of the sensors 30 of FIG. 1 based upon three different scenarios, i.e., the key fob 22 approaching the sensor (FIG. 2a), the key fob 22 moving away from the sensor 30 (FIG. 2b) and the key fob 22 passing by the sensor 30 in a manner which indicates that the driver probably does not intend to enter the vehicle 32 (FIG. 2c). The magnitude of the signals generated by the sensors 30 is preferably monitored by the controller 40 to generate profiles such as those illustrated in FIGS. 2a–c. Alternatively, controllers can be installed in each sensor 30a–e to generate these profiles and make the determination as to which scenario is occurring (e.g. FIGS. 2a–c).

As is shown in FIGS. 2a–c, the magnitude of the magnetic field 48 is compared to a first threshold, namely an interrogate threshold 50 and a second threshold, namely a wake-up threshold 52, which is less than the interrogate threshold 50. Generally, the magnitude of the magnetic field 48 is generally indicative of the distance of the key fob 22 from the sensor 30. Preferably, in order to conserve power, the controller 40 is normally in a sleep mode, but is monitoring the magnetic field 48. When the magnitude of the magnetic field 48 exceeds the wake-up threshold 52 for a predetermined period of time $t_1$, the controller 40 wakes up and enters full power mode. If the magnitude of the magnetic field 48 exceeds the interrogate threshold 50 for a predetermined time period, such as $t_2$ or $t_3$ (as will be described below), the controller 40 via the transmitter/receiver 42 transmits an interrogate signal. Other known vehicle security systems utilize interrogate signals, and the general operation is generally known. When the key fob 22 receives the interrogate signal from the controller 40, the key fob 22 transmits a code which is received by the transmitter/receiver 42 on the controller 40. If the controller 40 determines that the correct code has been transmitted, the controller 40 takes the appropriate action, depending upon its analysis of the profile of the magnitude of the magnetic field 48, as will be described below.

If the magnitude of the magnetic field 48 is increasing over time, as shown in FIG. 2a, and has exceeded the predetermined time period $t_2$, the controller 40 determines that the key fob 22 is approaching the door 34a–e associated with the sensor 30a–e which generated the profile in FIG. 2a. The controller 40 then deactivates the actuator 36a–e associated with that sensor 30a–e to unlock the door 34a–e that the key fob 22 is approaching. It should be recognized that the interrogate signal can be sent either at the beginning or at the end or during the time period $t_2$, so long as the actuator 36a is not deactivated until after the predetermined time period $t_2$.

If the controller 40 determines that the magnitude of the magnetic field 48 is decreasing over time as shown in FIG. 2b, the controller 40 determines that the key fob 22 is moving away from the door 34a–e associated with the sensor 30a–e that generated the profile shown in FIG. 2b. Preferably, the interrogate signal is sent at the beginning of period $t_3$, and associated actuator 36a–e is activated (i.e., the associated door 34a–e is locked) after the controller 40 determines that the key fob 22 is moving away from the associated sensor 30a–e. Since the key fob 22 has been interrogated and identified during period $t_3$, the controller 40 need not activate the actuator 36a–e right away, since even after the transmitter 26 and receiver 42 are out of range, the sensor 30 and controller 40 can still monitor the movement of the key fob 22 and magnet 24 away from the sensor 30 and activate the actuator 36 at any time.

Preferably, the sensors 30a–e and controller 40 determine which door (or, alternatively, doors) the key fob 22 is approaching and only deactivates the actuators 36a–e associated with that sensor or sensors 30a–e. In contrast, when the key fob 22 is moving away from any of the sensors 30, as shown in FIG. 2b, the controller 40 preferably sends signals to all of the actuators 36 to activate, unless the key fob 22 is simultaneously approaching a different sensor 30.

FIG. 2c illustrates a scenario and profile where the key fob 22 simply passes by one of the sensors 30. In such a scenario, the driver presumably does not have the intention of entering the vehicle 32, or at least the door 34a–e associated with that sensor 30. The magnitude of the magnetic field 48 may exceed the wake-up threshold 52 for the predetermined time period $t_1$, causing the controller 40 to exit the sleep mode and enter full power mode. The magnitude of the magnetic field 48 does not exceed the interrogate threshold 50; therefore, the controller does not transmit an interrogate signal and none of the actuators 36a–e are activated or deactivated. Other scenarios could be monitored by monitoring the profiles from the sensors 30 simultaneously, or by comparing and/or contrasting profiles from several sensors 30 simultaneously.

FIG. 3 illustrates a more detailed schematic of the controller 40 of FIG. 1, receiving signals from magnetic field sensors 30a–e. The controller 40 preferably includes a microprocessor 60 having software programmed to perform the functions as described above. The signals received from magnetic sensors 30a–e may be amplified by amplifiers 62 and converted to digital form for the microprocessor 60 by an analog to digital converter 64. The amplified signal from each magnetic sensor 30a–e is also compared to a reference signal by a comparator 66. The comparator 66 generates a signal when the amplified signal from a magnetic sensor 30 exceeds the reference signal. All of the outputs of the comparators 66(a–e) are connected to an OR gate 68, the output of which comprises a wake-up pulse, to send a wake-up signal to the microprocessor 60. As described above, the microprocessor 60 is connected to a transmitter/receiver 42 which includes an antenna 70, appropriate to the specific technology utilized (such as RF, infrared, microwave, etc.). The microprocessor 60 also includes a plurality of outputs 72, each of which are connected to one of the actuators 36a–e (FIG. 1) to activate and deactivate each actuator 36a–e as determined by the microprocessor 60. It should be recognized that the microprocessor 60 could alternatively be comprise hardware, such as combination logic, state machines, etc.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A passive keyless entry system that monitors a presence and a direction of movement of a portable keyless entry device relative to a sensor located on a vehicle for unlocking and locking a vehicle door based on the direction of movement of the portable keyless entry device relative to the sensor, the system comprising:
   a sensor located on the vehicle that detects a presence of the keyless entry device within a predetermined range to the sensor and generates a signal indicative of distance between the keyless entry device and the sensor based on the sensor measuring an intensity of the presence of the keyless entry device over time; and
   a controller arranged to determine the direction of movement relative to the sensor based on the sensor signal, wherein the controller is further arranged to control operation of a vehicle door actuator as follows: unlocking the door when the direction of movement is determined to be approaching the sensor and locking the door when the direction of movement is determined to be moving away from the sensor.

2. The system of claim 1, wherein said sensor determines if said movement is within a first threshold distance from said sensor, said system further including a transmitter sending an interrogation signal based upon said sensor detecting said movement within said first threshold distance.

3. The system of claim 2, further including a receiver receiving a code after said interrogation signal is transmitted.

4. The system of claim 2, wherein said system includes a sleep mode, said system exiting said sleep mode based upon said sensor detecting said movement generally within a second threshold less than said first threshold.

5. The system of claim 1, wherein the portable keyless entry device comprises a portable fob, said sensor detecting said movement of said fob.

6. The system of claim 5, wherein said fob includes a magnet, said sensor detecting a magnetic field from said magnet.

7. The system of claim 6, wherein said sensor determines a magnitude of said magnetic field, a controller monitoring a profile of said magnitude of said magnetic field over time, said controller activating and deactivating said actuator based upon said profile.

8. The system of claim 1, wherein operation of a vehicle door actuator includes maintaining a locked or unlocked status of the door when the direction of movement is determined to be passing by the sensor.

9. A passive keyless entry system that monitors a presence and a direction of movement of a portable keyless entry device relative to a sensor located on a vehicle for unlocking and locking a vehicle door based on the direction of movement of the portable keyless entry device relative to the sensor, the system comprising:

a plurality of actuators for unlocking and locking the vehicle door;

a plurality of sensors, each associated with one of the plurality of actuators, wherein each sensor is arranged to detect a presence of the keyless entry device within a predetermined range to the sensor and generate a signal indicative of distance between the keyless entry device and the sensor based on the sensor measuring an intensity of the presence of the keyless entry device over time; and a controller responsive to a generated sensor signal for deactivating an actuator based upon detection of motion of the keyless entry device toward the associated sensor.

10. The system of claim 9, wherein all of said actuators are activated upon detection of motion away from said sensors.

11. The system of claim 9, further including a controller receiving motion information from said sensors and selectively activating and deactivating each of said actuators, said controller deactivating only said actuator associated with said associated sensor that detected said motion toward associated sensor while the others of said actuators are not deactivated.

12. The system of claim 9, further including a fob having a magnet, said sensors detecting a magnetic field from said magnet, said sensors detecting motion of said fob based upon said magnetic field, said actuators activated and deactivated based upon said motion of said fob.

13. The system of claim 12, further including a controller monitoring a profile of said magnetic field over time, said controller activating and deactivating said actuator based upon said profile.

14. The system of claim 13, further including a transmitter sending an interrogation signal based upon said sensors detecting said fob within a first predetermined threshold distance.

15. The system of claim 14, wherein said system includes a sleep mode, said system exiting said sleep mode based upon said sensors detecting motion generally within a second threshold less than said first threshold.

16. A method for passive keyless entry that controls operation of a vehicle locking system based on presence and direction of movement of a portable keyless entry device relative to a sensor located on a vehicle, the method comprising:

generating a signal indicative of a presence of the keyless entry device within a predetermined range to the sensor and distance between the keyless entry device and the sensor based on the sensor measuring an intensity of the presence of the keyless entry device over time;

determining the direction of movement relative to the sensor based on the generated distance signal;

automatically actuating the locking system to unlock a door when the direction of movement is determined to be approaching the sensor; and automatically actuating the locking system to lock a door when the direction of movement is determined to be moving away from the sensor.

17. The method of claim 16 further including the step of:

sending an interrogation signal when the distance of the portable keyless entry device is below a first threshold.

18. The method of claim 16 further including the step of determining the direction of motion of said portable keyless entry device relative to each of a plurality of doors, said method further including the step of unlocking a first door based upon motion of said fob toward said first door while said plurality of doors other than said first door remain locked.

19. The method of claim 16 further including the steps of:

monitoring a profile of a magnetic field produced by the portable keyless entry device over time; and controlling access to said area based upon said profile.

20. The method of claim 16, further comprises maintaining a locked or unlocked status of the door when the direction of movement is determined to be passing by the sensor.

* * * * *